(12) United States Patent
Dardenne et al.

(10) Patent No.: US 9,485,353 B2
(45) Date of Patent: Nov. 1, 2016

(54) METHOD AND DEVICE FOR DETECTING A BRIDGED TAP WITHIN A TELECOMMUNICATION LINE

(71) Applicant: Alcatel Lucent, Boulogne-Billancourt (FR)

(72) Inventors: Xavier Dardenne, Namur (BE); Benoît Drooghaag, Namur (BE)

(73) Assignee: Alcatel Lucent, Boulogne-Billancourt (FR)

( * ) Notice: Subject to any disclaimer, the term of this patent is extended or adjusted under 35 U.S.C. 154(b) by 66 days.

(21) Appl. No.: 14/399,109

(22) PCT Filed: May 22, 2013

(86) PCT No.: PCT/EP2013/060528
§ 371 (c)(1),
(2) Date: Nov. 5, 2014

(87) PCT Pub. No.: WO2013/186023
PCT Pub. Date: Dec. 19, 2013

(65) Prior Publication Data
US 2015/0117634 A1  Apr. 30, 2015

(30) Foreign Application Priority Data

Jun. 13, 2012 (EP) .................................... 12305672

(51) Int. Cl.
*H04M 1/00* (2006.01)
*H04M 3/00* (2006.01)
(Continued)

(52) U.S. Cl.
CPC .............. *H04M 3/362* (2013.01); *H04M 3/08* (2013.01); *H04M 3/26* (2013.01); *H04M 2201/18* (2013.01)

(58) Field of Classification Search
CPC ..................................................... H04M 3/362
See application file for complete search history.

(56) References Cited

U.S. PATENT DOCUMENTS 5,461,318 A * 10/1995 Borchert ................ G01R 31/11
324/532
5,517,523 A * 5/1996 Nabors .................... H04B 3/08
333/18

(Continued)

FOREIGN PATENT DOCUMENTS

CN 101207654 A 6/2008
CN 101729683 A 6/2010

(Continued)

OTHER PUBLICATIONS

Joao C. W. A. Costa et al,, "Characterization of Subscriber Local Loop by Measures and Analysis of Frequency and Impulse Responses," pp. 1-11, Broadband Access Communication Technologies, Proc. of SPIE vol. 6390.

(Continued)

*Primary Examiner* — Joseph T Phan
(74) *Attorney, Agent, or Firm* — Harness, Dickey & Pierce, P.L.C.

(57) ABSTRACT

The present invention refers to a method and device for detecting a bridged tap within a telecommunication line. In order to reliably detect bridged taps of different types, in particular wire pair bridged taps and single wire bridged taps, and/or to determine a type of each detected bridged tap the method includes determining first transfer function data that characterize an actual transfer function of the telecommunication line; detecting the bridged tap depending on the first transfer function data; simulating the telecommunication line based on a result of the detecting; and identifying the type of the bridged tap by comparing results of the simulating with the first transfer function data.

14 Claims, 6 Drawing Sheets

(51) Int. Cl.
*H04M 3/36* (2006.01)
*H04M 3/08* (2006.01)
*H04M 3/26* (2006.01)

(56) References Cited

U.S. PATENT DOCUMENTS

| | | | | |
|---|---|---|---|---|
| 6,177,801 | B1* | 1/2001 | Chong | G01R 31/024 324/520 |
| 6,865,221 | B2 | 3/2005 | Belge | |
| 7,324,587 | B2* | 1/2008 | Nishizaki | H04L 1/00 375/222 |
| 7,577,205 | B1* | 8/2009 | Liu | H04B 3/30 375/258 |
| 7,583,797 | B2* | 9/2009 | Rahamim | H04L 27/0002 379/399.01 |
| 8,041,009 | B2* | 10/2011 | Defoort | H04B 3/46 379/1.03 |
| 8,065,100 | B2* | 11/2011 | Lindqvist | H04M 3/306 702/57 |
| 8,170,505 | B2* | 5/2012 | Keerti | H03F 1/56 330/302 |
| 8,254,527 | B2* | 8/2012 | Lindqvist | H04M 3/306 379/1.03 |
| 2003/0001586 | A1* | 1/2003 | Warke | H04M 3/30 324/527 |
| 2003/0147506 | A1* | 8/2003 | Kamali | H04L 12/2697 379/22.02 |
| 2003/0222730 | A1* | 12/2003 | Watanabe | H03H 7/38 333/32 |
| 2004/0066933 | A1* | 4/2004 | Jeffery | H04M 1/76 379/380 |
| 2005/0036560 | A1* | 2/2005 | Lu | H04M 3/306 375/257 |
| 2005/0243904 | A1* | 11/2005 | Hart | H04L 12/66 375/222 |
| 2006/0227940 | A1* | 10/2006 | Ferdosi | H04M 3/085 379/22.04 |
| 2008/0219413 | A1* | 9/2008 | Duvaut | H04M 3/302 379/3 |
| 2008/0240368 | A1 | 10/2008 | Duvaut et al. | |
| 2010/0061434 | A1* | 3/2010 | Singh | H04B 3/46 375/224 |
| 2011/0058502 | A1* | 3/2011 | Feng | H04M 3/30 370/255 |

FOREIGN PATENT DOCUMENTS

| | | |
|---|---|---|
| JP | 2003-224498 A | 8/2003 |
| JP | 2008118687 A | 5/2008 |
| JP | 2008536350 A | 9/2008 |
| KR | 2002-0079772 | 10/2002 |
| WO | WO-0143303 A2 | 6/2001 |
| WO | WO-2005036189 A1 | 4/2005 |
| WO | WO-2009022374 A1 | 2/2009 |

OTHER PUBLICATIONS

International Search Report PCT/ISA/210 for International Application No. PCT/EP2013/060528 Dated Jul. 3, 2013.

Written Opinion of the International Searching Authority PCT/ISA/237 for International Application No. PCT/EP2013/060528 Dated Jul. 3, 2013.

Masami Ueda et al., A study on ADSL transmission performance affected by bridged taps, IEICE 1997 Communications Society Conference Collected Papers 2, The Institute of Electronics, Information and Communication Engineers, Aug. 13, 1997, p. 259.

* cited by examiner

METHOD AND DEVICE FOR DETECTING A BRIDGED TAP WITHIN A TELECOMMUNICATION LINE

FIELD OF THE INVENTION

The present invention refers to a method for detecting bridged taps within a telecommunication line. Furthermore, the invention refers to a device arranged for detecting the bridged taps and to a computer program product programmed for executing the method for detecting the bridged tap within the telecommunication line.

BACKGROUND

It is known to perform single ended line testing (SELT) in digital subscriber lines (DSL). SELT comprises reflectometry-based measurement procedures that allow for determining, at least in some cases, a location of a bridged tap in a subscriber line.

A bridged tap is a branch at the telecommunication line, with the first end of the bridged tap corresponding to a junction point within the telecommunication line. A second end of the bridged tap may be open or connected to a device not belonging to the digital subscriber line. For instance, a bridged tap may be the result of incorrect wiring e. g. in a remote cabinet. A bridged tap can also occur in in-house wiring. For example, a bridged tap can be created by connecting analogue or ISDN telephone equipment to a segment of the telecommunication line connected to a DSL modem without using a DSL splitter to properly separate the frequency bands used for DSL data transmission and telephony from each other.

When operating a telecommunication line having a bridged tap, unwanted reflections may occur at the first end and/or at the second end of the bridged tap in particular when the bridged tap is not correctly terminated at its second end. Because these reflections may disturb DSL data transmissions, it is required to detect and remove a bridged tap.

Known approaches for detecting a bridged tap within a telecommunication line cannot determine a type of the bridged tap. A bridged tap can be of a first type, where the bridged tap has two electrical conductors that are connected to both conductors of a conductor pair of the telecommunication line. In the following, this type of bridged tap will be referred to as "wire pair bridged tap". Bridged taps of a second type have only one conductor or wire that is connected to one of the two electrical conductors of the telecommunication line. Bridged taps of this second type will further be referred to as "single wire bridged taps".

When using known approaches for detecting a bridged tap, wire pair bridged taps are typically rather reliably detected. However, single wire bridged taps are much less reliably detected because single wire bridged taps have a smaller impact on the transfer function of the telecommunication line than wire pair bridged taps.

SUMMARY

The object of the present invention is to provide a method and a device that allows for reliably detecting bridged taps of different types—in particular wire pair bridged taps and single wire bridged taps—and/or to determine the type of each detected bridged tap. This object is solved by a method according to claim 1, a device for detecting bridged taps according to claim 14 and a computer program product according to claim 16.

According to an embodiment, a method for detection of a bridged tap within a telecommunication line is provided, the method comprising determining first transfer function data that characterize an actual transfer function of the telecommunication line; detecting a bridged tap depending on the first transfer function data; simulating the telecommunication line based on a result of said detecting; and identifying a type of the bridged tap by comparing results of said simulating with the first transfer function data. The result of said simulating may include simulated transfer function data that characterize a simulated transfer function of the telecommunication line.

By simulating the telecommunication line based on the result of the detection of the bridged tap and comparing the result of the simulation with the first transfer function data, the single wire bridged taps and the wire pair bridged taps can be distinguished from each other reliably although the impact of a single wire bridged tap and a wire pair bridged tap on the transfer function are very similar.

In a preferred embodiment, the type of the bridged tap includes a single wire bridged tap and a wire pair bridged tap and/or the identifying the type of the bridged tap comprises deciding whether the detected bridged tap is a single wire bridged tap or a wire pair bridged tap.

In an embodiment, the detecting a bridged tap comprises determining at least one characteristic of the detected bridged tap, preferably a length of the bridged tap. This characteristic may be used as a parameter for simulating the telecommunication line. Determining the at least one characteristic therefore allows to improve the accuracy of the simulation. A bridged tap typically causes local minima—so called dips—in the transfer function. The characteristic of the detected bridged tap, in particular the length of the bridged tap, may be determined by analyzing the position of these dips in the frequency axis of the transfer function.

At the time of simulating, the type of the bridged tap is not known. Thus, the simulating the telecommunication line may include assuming that the bridged tap has a certain type. For example, it can be assumed that the bridged tap is a single wire bridged tap or it can be assumed that a bridged tap is a wire pair bridged tap. By comparing the results of simulating the telecommunication line with the first transfer function data, i.e. the measured transfer function, the assumption regarding the type of the bridged tap can be verified. If the result of the simulation and the first transfer function represented by the first transfer function data are quite similar then the assumption can be considered as correct and the assumed type of the bridged tap corresponds to the actual type of bridged tap. However, if the results of the simulation and the first transfer function data differ from each other then the assumption regarding the type of the bridged tap may be considered incorrect and the method may conclude that the type of the bridged tap present in the telecommunication line is different from the assumed type.

In an embodiment, for each possible assumption about the type of the bridged tap, a simulation is performed and the result of the simulation related to each possible assumption is compared with the first transfer function data. The result of this multiple comparisons is used in order to identify the type of the bridged tap.

In an embodiment, the simulating comprises calculating first simulated transfer function data that characterize a first simulated transfer function of the telecommunication line, assuming that the bridged tap is a wire pair bridged tap, said calculating depending on the at least one characteristic of the identified bridged tap, preferably depending on the length of the identified bridged tap, and said identifying depending on the first transfer function data and the first simulated transfer function data. In particular, the first transfer function data and the first simulated transfer function data may be compared with each other in order to identify the type of the bridged tap.

Preferably, the method may comprise calculating second simulated transfer function data that characterize a second simulated transfer function of the telecommunication line assuming that the bridged tap is a single wire bridged tap, said calculating depending on the at least one characteristic of the identified bridged tap, preferably depending on the length of the identified bridged tap, and said identifying depending on the second simulated transfer function data. In other words, the type of the bridged tap is identified depending on the first simulated transfer function data, the second simulated transfer function data and the first transfer function data. In an embodiment, the first simulated transfer function data are compared with the first transfer function data and the second simulated transfer function data are compared with the first transfer function data. Based on these two comparisons, the type of the bridged tap may be identified. For example, the method may decide which one of the simulated transfer functions is more similar to the actual transfer function of the telecommunication line represented by the first transfer function data. If the actual transfer function represented by the first transfer function data is more similar to the first simulated transfer function than to the second simulated transfer function, then the method may identify a wire pair bridged tap. If the actual transfer function represented by the first transfer function data is more similar to the second simulated transfer function than to the first simulated transfer function than the method may decide that the bridged tap is a single wire bridged tap.

In an embodiment, the method comprises determining second transfer function data depending on the first transfer function data, the second transfer function data characterizing a transfer function of the telecommunication line without any bridged taps and the detection of the bridged tap depending on the first transfer function data and the second transfer function data. By determining the second transfer function data, the actual transfer function can be related to the second transfer function data that represents the case where no bridged tap is present. Consequently, the influence of the bridged tap on the transfer function can be derived.

In an embodiment, determining the second transfer function data comprises identifying maxima within the actual transfer function and using these maxima as supporting points for calculating the second transfer function data, e.g. by connecting together the identified maxima. Because the bridged tap leads to local minima (dips), using the maxima, which typically are located between the local minima, as supporting points for calculating the second transfer function leads to a rather good approximation of a transfer function of the telecommunication line having no bridged taps.

In order to further improve the approximation, determining the second transfer function data may comprise smoothing a function characterized by the second transfer function data. To this end, the second transfer function data may be filtered e.g. by means of a low pass filter.

In another embodiment, determining the second transfer function data comprises fitting the first transfer function data or data derived from the first transfer function data to a curve that represents the transfer function of the telecommunication line without any impairment, in particular without any bridged tap. The curve that represents the transfer function may correspond to a mathematical model of the transfer function. For example, fitting the first transfer function data to the curve may comprise adapt fitting parameters of the mathematical model so that the curve represents an optimal approximation of the transfer function represented by the first transfer function data. In order to find these optimal fitting parameters, known regression methods, in particular non-linear regression methods, may be applied. Said data derived from the first transfer function data may be determined by using the identified maxima of the actual transfer function data as supporting points, e.g. by connecting together the identified maxima.

In a preferred embodiment, the curve has a decaying exponential run and fitting parameters of the curve include an attenuation factor and/or a length value, the length value depending on the length of the telecommunication line. These fitting parameters describe physical characteristics of the telecommunication line that may be used as input parameters for simulating the telecommunication line.

In an embodiment, detecting the bridged tap comprises calculating a difference of the two transfer functions, preferably by subtracting the second transfer function data from the first transfer function data or by subtracting the first transfer function data from the second transfer function data. This subtracting leads to a difference transfer function that includes the impact of the bridged tap on the transfer function with the overall decaying run of the transfer function eliminated. The difference transfer function can be rather easily analyzed in order to detect the bridged taps.

In a preferred embodiment, the method comprises calculating a length of the bridged tap depending on the first transfer function, or preferably depending on a difference transfer function. The difference transfer function may be a difference of the first transfer function and the second transfer function, which difference may be calculate by subtracting the first transfer function data from the second transfer function data or vice versa. The lengths of the bridged tap is a further physical characteristic of the telecommunication line that, in an embodiment, may be used as a further input parameter for simulating the telecommunication line.

Thus, in an embodiment the simulating of the telecommunication line depends on the at least one fitting parameter of the curve and/or the calculated length of the bridged tap.

According to another preferred embodiment, a device for detection of the bridged tap within a telecommunication line is provided, the device being operable for determining first transfer function data that characterize an actual transfer function of the telecommunication line; detecting the bridged tap depending on the first transfer function data; simulating the telecommunication line based on a result of said detecting; and identifying a type of the bridged tap by comparing results of said simulating with the first transfer function data.

For instance, the device may be an access node, e.g. a DSL Access Multiplexer (DSLAM), for a fixed access network, a network node for customer's premises, e.g. a DSL modem of a fixed access network, or a monitoring station arranged to be connected to the fixed access network.

In an embodiment, the device is arranged, preferably programmed, for executing a method according to the invention, embodiments of which method are described herein.

According to yet another preferred embodiment, a computer program product, preferably a storage medium, is provided, said computer program product comprising a computer program that is programmed for executing a method to the invention, when executed by a computer, embodiments of which method are described herein. The storage medium may be of any type. In particular the storage medium may comprise semiconductor memory such as ROM or FLASH memory, an optical medium such as a CDROM or DVD or a magnetic medium such as a hard disc, a floppy disc or magnetic tape. Furthermore, the computer program product may stored on a server for download over a communication network, e.g. over the Internet. The computer program product may comprise a storage element of a controller programmed for executing a method according the present invention.

BRIEF DESCRIPTION OF THE FIGURES

Exemplary embodiments and further advantages of the present invention are shown in the Figures and described in detail hereinafter.

DESCRIPTION OF THE EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
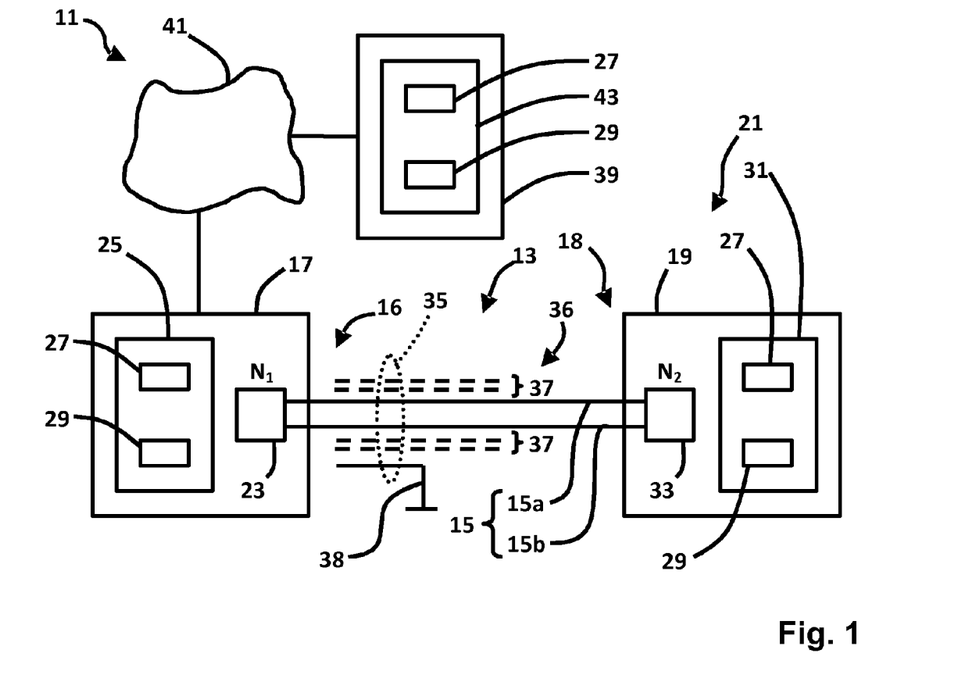
FIG. 1 shows a telecommunication network according to a preferred embodiment of the present invention.

FIG. 1 shows a communication network 11 comprising a telecommunication line 13. The telecommunication line 13 has a pair 15 of electrical conductors 15a, 15b with a first end 16 of the pair 15 being connected to a network side termination node of the network 11, further referred to as access node 17, and a second end 18 of the pair 15 being connected to a terminal side termination node 19 of the network 11. The terminal side termination node 19 may be part of customer premises equipment (CPE 21) of the network 11.

In the shown embodiment, the telecommunication line 13 is a Digital Subscriber Line (DSL), such as an ADSL, a VDSL or the like. Consequently, the access node 17 may be a DSL Access Multiplexer (DSLAM) or another type of DSL access node. The terminal side termination node 19 may be a DSL modem or include a DSL modem. However, the present invention is not limited to DSL. In another embodiment, the network 11 comprises a different type of telecommunication line 13.

The access node 17 has first modem circuitry 23 to which the first end 16 of the pair 15 is connected. In addition, the access node 17 has a first controller 25 adapted for controlling the operation of the access node 17. In an embodiment, the first controller 25 is a programmable computer comprising a processor 27, e. g. a microprocessor, and a storage element 29, e.g. semiconductor memory.

The terminal side termination node 19 includes second modem circuitry 33 to which the second end 18 of the pair 15 is connected. Furthermore, the terminal side termination node 19 comprises a second controller 31. The second controller 31 may have the same basic configuration as the first controller 25, i.e. the second controller 31 may be a programmable computer and comprise a processor 27 and/or a storage element 29.

In the shown embodiment, at least a part of the pair 15 is part of a binder 35 and extends in parallel to at least one further telecommunication line 36. Each further line 36 comprises a further conductor pair 37. The binder 35 may comprise an electrically conductive, preferably metallic, shielding 38 that may be grounded as depicted in FIG. 1.

Furthermore, the network 11 may comprise an optional monitoring station 39 connected e. g. via a interconnection network 41 to at least one of the nodes 17, 19 such that the station 39 can communicate with at least one of the nodes 17, 19, preferably the access node 17. The station 39 comprises a third controller 43. The third controller 43 may have the same basic configuration as the first controller 25, i.e. the third controller 43 may be a programmable computer and comprise a processor 27 and/or a storage element 29. In an exemplary embodiment, the station 39 may be a server computer, a personal computer, a handheld computer such as a PDA or cell phone, etc. In an embodiment, the collection and processing of the measurement data may not be done in the cell phone or laptop, but by a platform server. In this embodiment, the phones are clients that can retrieve the results of the collection and processing from the server.

At least one of the controllers 25, 31 or 43 is arranged for executing a method described herein for detecting a bridged tap within the telecommunication line 13, in particular within the pair 15 of conductors 15a, 15b. To this end, a computer program may be provided that is programmed such that at least one of the controllers 25, 31, 43 executes the method when running that computer program. In other words, the method may be executed on the access node 17, on the station 39, or the terminal side termination node 19. The computer program may be stored on at least one storage element 29. In addition, the computer program may be stored on any type of data storage media such as magnetic or optical disc or semiconductors charge media. Furthermore, the program may be provided by a server for transmission over a network, preferably the internet.

Figure 2:
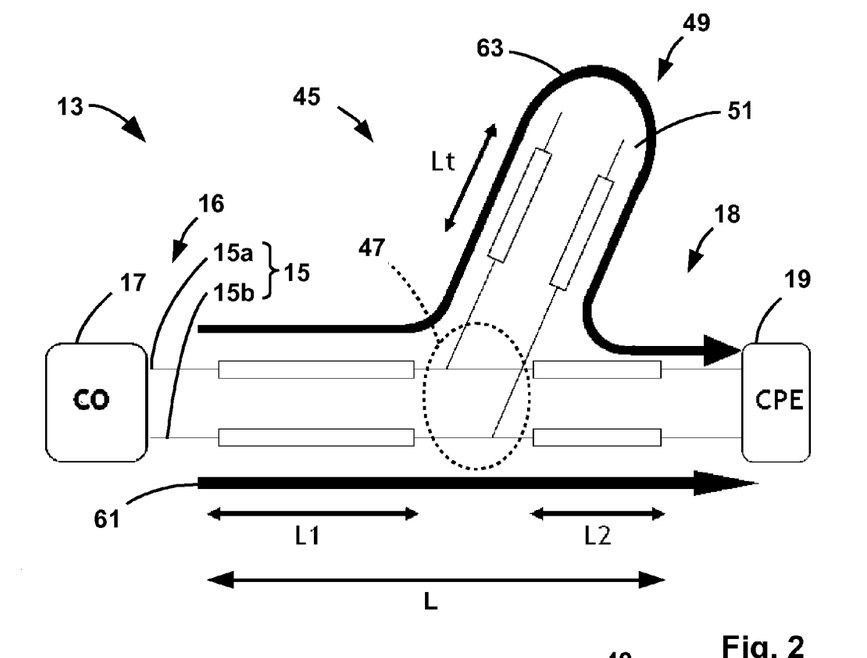
FIG. 2 is a schematic diagram of a wire pair bridged tap.

FIG. 2 shows the telecommunication line 13 in case of a bridged tap of the wire pair type. This wire pair bridged tap 45 extends between a junction point 47 of the conductor pair 15 of the telecommunication line 13 and a distant end 49 of the wire pair bridged tap 45. The wire pair bridge tap 45 comprises a further conductor pair 51, typically a wire pair, with each conductor or wire of this further conductor pair 51 being connected to one electrical conductor 15a, 15b.

The conductor pair 15 of the telecommunication line 13 has a length L. A first section of the conductor pair 15 between the access nodes 17 and the junction point 47 has a length L1. A second section of the conductor pair 15 between the junction point 47 and the terminal side termination node 19 has a length L2. The total length is the sum of the lengths of the sections, L=L1+L2. The length of the further conduction pair 51—further simply referred to as length of the bridged tap—is denoted with Lt.

Figure 3:
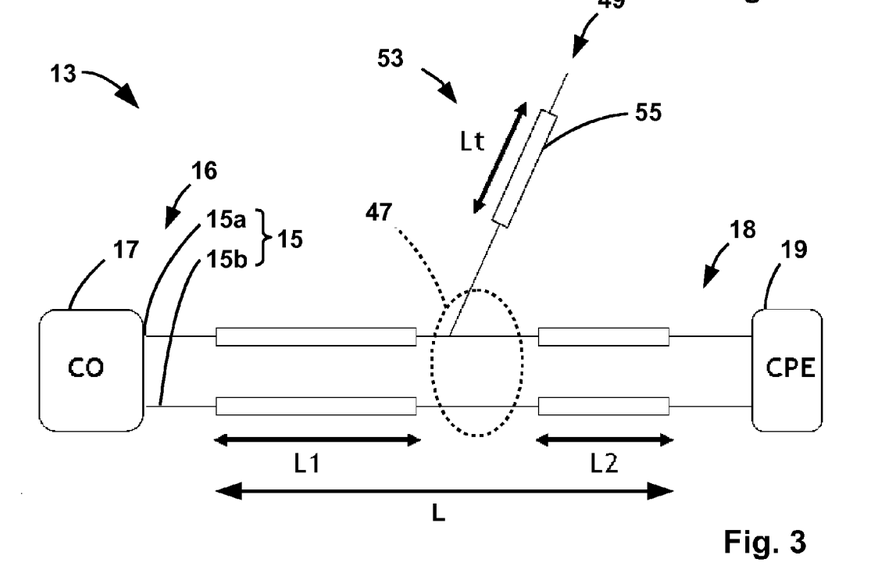
FIG. 3 is a schematic diagram of a single wire bridged tap.

FIG. 3 shows the telecommunication line 13 in case of a bridged tap of the single wire type. This single wire bridged tap 53 has a single further conductor 55 which is connected to one of the electrical conductors 15a, 15b of the conductor pair 15 at the junction point 47. There is no electrical connection between the single wire bridged tap 53 and the other electrical conductor 15b, 15a. In the shown example, the single further conductor 55 is connected to the first electrical conductor 15a of the conductor pair 15. In FIG. 3, the length L1, L2 of the two sections of the conductor pair 15 and the length Lt of the single wired bridged tap 53 are depicted.

Figure 4:
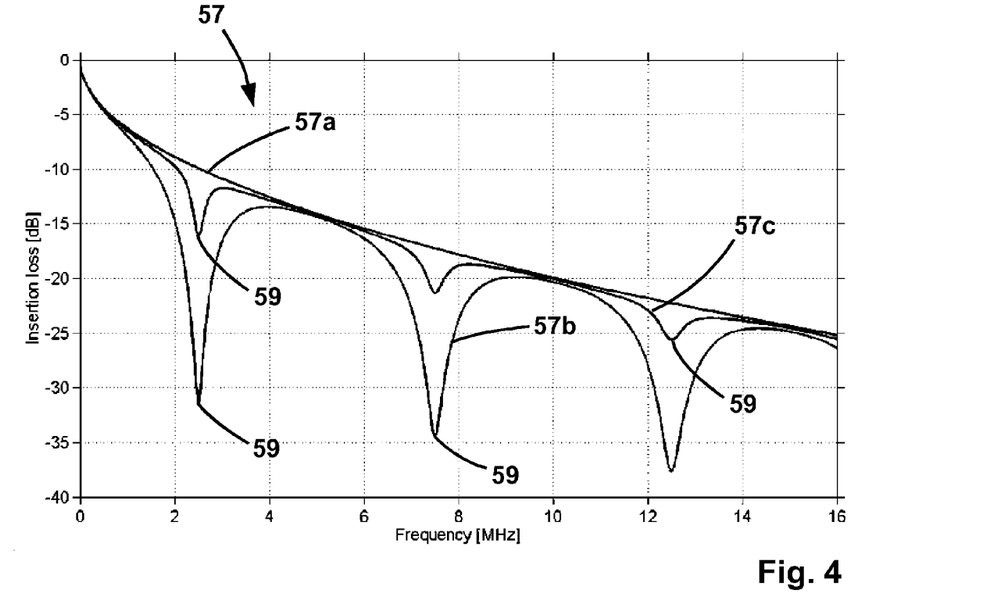
FIG. 4 shows a diagram of transfer functions of a telecommunication line without any bridged tap, a transfer function of the telecommunication line having a wire pair bridged tap and the transfer function of the telecommunication line having a single wire bridged tap.

FIG. 4 shows the measured transfer function of the communication line 13 for three different scenarios. In particular, a first measured transfer function 57a corresponds to the transmission line 13 without any bridged tap. A second measured transfer function 57b corresponds to the telecommunication line 13 with a wire pair bridged tap. Finally, a third measured transfer function 57c corresponds to the telecommunication line 13 with a single wire bridged tap. The measured transfer functions 57 are depicted in a common diagram, an x-axis of which shows the frequency in MHz and the y-axis of which shows an attenuation in dB along the telecommunication line 13 as a function of the frequency. The exemplary transfer functions 57 shown in FIG. 4 refer to a total length L=500 m of the telecommunication line 13 and a length Lt=20 m of the bridged taps 45, 53.

As can be seen from FIG. 4, the transfer function 57 has regularly spaced a local minima 59 (so-called "dips" 59) if and only if there is at least one bridged tap 45, 53 present in the telecommunication line 13. Thus, the bridged tap 45, 53 can be detected by analyzing the measured transfer function 57, in particular by checking whether the transfer function 57 has the local minima 59. Measurement data H log that describe the transfer function 57 may be retrieved by means of DELT.

In case of a wire pair bridged tap 45, the telecommunication line 13 has two propagation paths, i.e. a direct path (arrow 61) going directly from the access node 17 to the terminal side termination node 19. As well as an indirect path (arrow 63) that starts at the access node 17, goes through the junction point 47 to the distant end 49, returns to the junction point 47 and finally ends at the terminal side termination node 19 (see FIG. 2).

The signal propagation of a signal having a certain frequency f along the two propagation paths can be described by means of phasors:

$$\text{direct path: } r_1 = e^{-\gamma \cdot (L_1 + L_2)} \quad (1)$$

$$\text{indirect path: } r_2 = e^{-(\gamma \cdot (L_1 + L_2 + 2 \cdot L_t))} \quad (2)$$

The variable $\gamma = \gamma(f)$ is the propagation constant of the telecommunication line 13. The phasor $r_1$ describes the transmission along the direct path 61, and the phasor $r_2$ describes the signal propagation along the indirect path 63. The propagation behavior of the telecommunication line 13 is described by the sum of these phasors:

$$r = r_1 + r_2 = e^{-\gamma \cdot (L_1 + L_2)}(1 + e^{-2 \cdot \gamma \cdot L_t}) \quad (3)$$

The local minima 59 are the result of destructive interference of signals along the direct path 61 and the indirect path 63. The frequency $f_n$ of the local minima can be calculated as follows:

$$-2 \cdot \text{Im}[\gamma] \cdot L_t = (2n+1) \cdot \pi \quad (4)$$

$$\Rightarrow -4 \cdot \pi \frac{f}{c} \cdot L_t = (2n+1) \cdot \pi$$

$$\Rightarrow f_n = (2n+1) \frac{c}{4 \cdot L_t}$$

Hence, the measured transfer function 57b, 57c will present deep dips 59 at frequencies corresponding to odd multiples of $c/4L_t$ where c stands for the phase velocity.

In an embodiment of a method for detecting the bridged taps 45, 53, the local minima in the measured transfer function 57 are detected and the method verifies whether the frequencies of the detected local minima follow at least essentially the previous equation (4).

In case of a single wire bridged tap 53 as shown in FIG. 3, the single further conductor 55 is able to propagate energy in the form of surface waves. In addition, the single further conductor 55 can form a transmission line with other conductors in its vicinity (e.g. wires of the main transmission line to which it is connected, other wires in the vicinity of the line 13, ground, etc.) Hence, a fraction of the energy propagating along the main line 15 can also propagate along the further single conductor 55 and be reflected at its distant end 49, exactly as in the case of a wire pair bridged tap 45. However, because of a relatively high impedance mismatch between the conductor pair 15 and the single wire bridged tap 55 and due to relatively high attenuation, the effects of the above-described distractive interference are much less pronounced. As a consequence, the local minima in the measured transfer function 57c are smaller than the local minima of the measured transfer function 57b related to the telecommunication line 13 with a wire pair bridged tap, as can be seen in FIG. 4.

Figure 5:
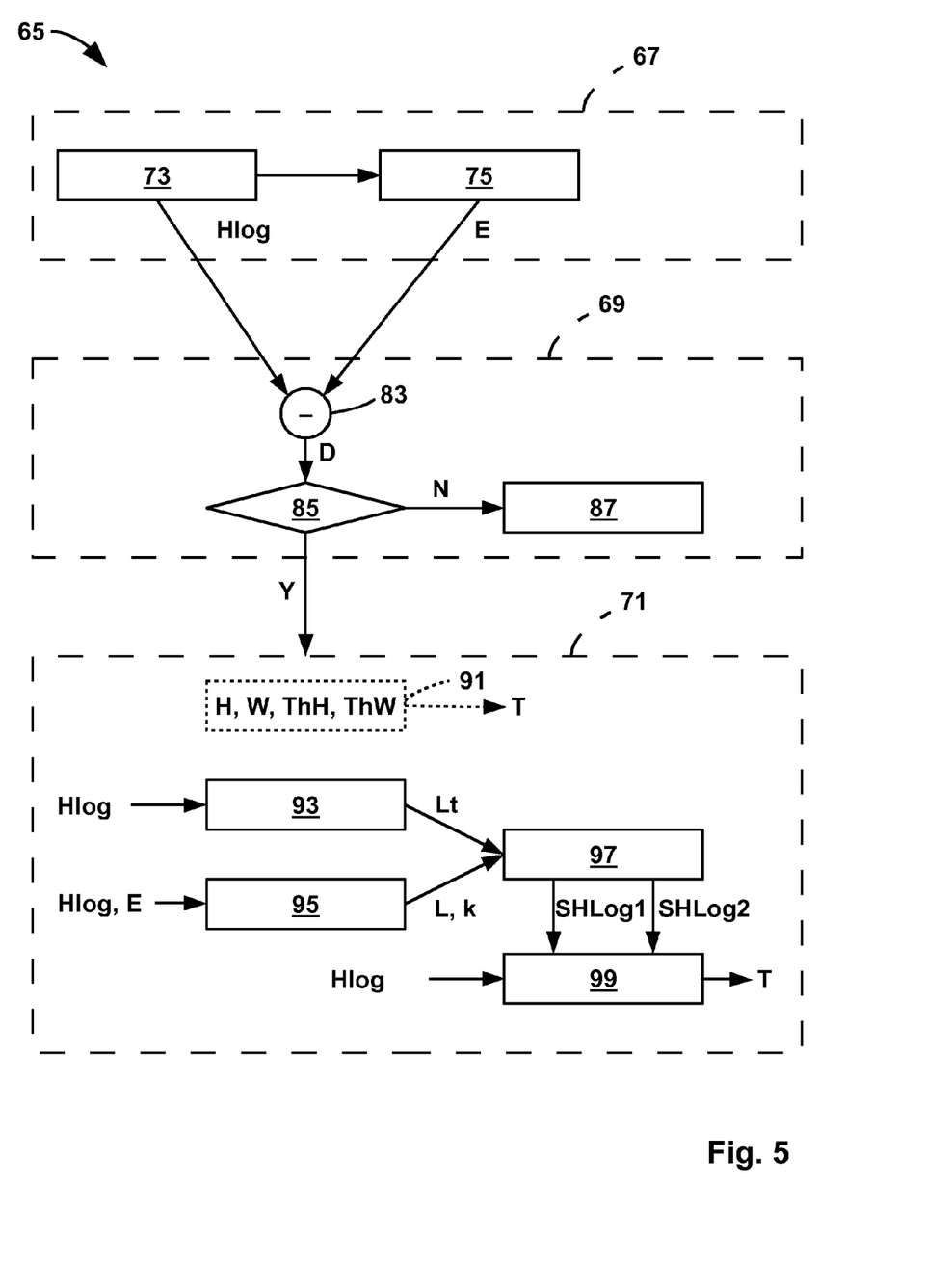
FIG. 5 shows a flowchart of a method for detecting bridged taps.

FIG. 5 shows a flowchart of an exemplary method 65 for detecting the bridged tap 45, 53 in the telecommunication line 13. The method 65 has a measurement and an analyses block 67, a bridged tap detection block 69 and a type identification block 71 for identifying the type of the detected bridged tap. Thus, the method 65 not only detects a bridged tap 45, 53 but also identifies the type of the bridged tap, i.e. decides whether the bridged tap is a wire pair bridged tap 45 or a single-wire bridged tap 53.

The measurement and analysis block 67 comprises a step 73 that determines first transfer function data H log that characterizes a measured transfer function of the telecommunication line 13. In other words, the first transfer function data H log describe the actual transfer function 57 of the telecommunication line 13. For example, determining the first transfer function data H log may include performing Dual End Line Testing (DELT). The measurement data H log that characterize the transfer function 57 may be stored on at least one of the nodes 17 and 19. The first transfer function data H log may be retrieved from the nodes 17 and/or 19 by means of a communication protocol such as SNMP. The first transfer function data H log may comprise multiple values of the magnitude of the transfer function 57, with each magnitude value corresponding to a different frequency. Preferably, the values of the magnitude of the transfer function 57 are represented in a logarithmic scale. The first transfer function data may be generated using DELT. In an embodiment, a first transfer function data H log are generated during a certain phase during an operation of the access node 17 and the terminal side termination node 19. For instance, the first transfer function data H log may be generated during a synchronization phase of the first modem circuitry 23 and the second modem circuitry 33 with each other and stored on the access node 17 and/or the terminal side termination node 19 so that a step 73 may retrieve them.

A step 75 of the measurement and analysis block 67 determines second transfer function data E depending on the first transfer function data H log. The second transfer function data E characterizes a transfer function of the telecommunication line 13 without any bridged taps 45, 53. In other words, step 75 eliminates at least essentially the impact of the bridged tap 45, 53 from the first transfer function data H log. The function represented by the second transfer function data E is at least similar to the transfer function of the telecommunication line 13 without bridged taps and therefore looks like an envelope of the measured transfer function 57.

Figure 6:
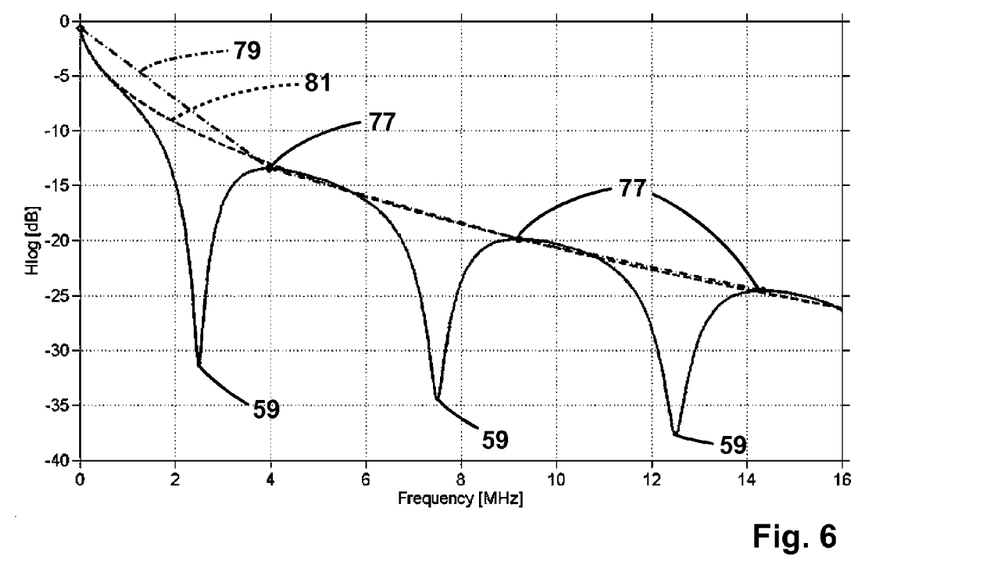
FIG. 6 shows diagrams of a measured transfer function of the telecommunication line with a wire pair bridged tap and two approximated transfer functions of the telecommunication line without any bridged tap.

Functions characterized by the first measurement data H log and the second transfer function data E are shown in FIG. 6 for an exemplary scenario. According to this scenario an L=500 m DSL line 13 is considered. The phase velocity is c=2·10⁸ m/s, an attenuation factor amounts to k=1.45·10⁻⁶ m⁻¹, and the length of the bridged tap 45, 53 is Lt=20 m. The corresponding measured transfer function 57 has regularly-spaced local minima 59 corresponding to odd multiples of 2.5 MHz. Using equation (4), the bridged tap length Lt can be computed as $$L_t = \frac{2 \cdot 10^8}{4 \cdot 2.5 \cdot 10^6} = 20 \text{ m}$$

The dot and dash curve 79 and the dashed curve 81 in FIG. 6 show transfer functions represented by the second transfer function data E that are calculated using two different exemplary variants of step 75.

According to the first variant, step 75 calculates the second transfer function data by identifying maxima 77 of the measured transfer function 57. In this embodiment, the maxima 77 are used as supporting points for calculating the second transfer function data E. As can be seen in FIG. 6, the maxima 77 are local maxima located between two adjacent local minima 59. The maxima 77 can be identified by analyzing the first transfer function data H log. That is, the function represented by the second transfer function data corresponds to the curve 79 that is obtained by connecting neighboring maxima 77 with each other. In an embodiment, the function resulting by using the maxima 77 as supporting points and/or by connecting neighboring maxima with each other may be smoothed using suited numerical methods such as low pass filtering. For example a moving average algorithm such as exponential weighted moving average can be used in order to smooth the function. The curve 79 in FIG. 6 is obtained when calculating the second transfer function data according to this embodiment.

According to the second variant, step 75 determines the second transfer function data E by fitting the first transfer function data H log or data derived from the first transfer function data (derived data) to the curve 81 that represents the transfer function 57a of the telecommunication line 13 without any bridged tap 45, 53. The derived data may be data that are calculated by using the maxima 77 used as supporting points, e.g. said derived data may correspond to the curve 79 that is obtained by connecting neighboring maxima 77 with each other. In other words, the embodiment according to the second variant using the derived data corresponds at least essentially to the above-described first variant where the smoothing is replaced with the fitting. That is, the second transfer function data E may be obtained by connecting the maxima 77 with each other and then fitting the resulting derived data to the curve 81 that represents the transfer function 57a of the telecommunication line 13 without any bridged tap 45, 53.

This curve 81 may be modeled using any mathematical model, preferably a function that has a decaying exponential run. In an embodiment, the mathematical model includes fitting parameters such as the attenuation factor k and/or a length value L that depends on the length of the telecommunication line 13 to be modeled. In an embodiment, the length value L is the length of the telecommunication line 13. In an exemplary embodiment, the curve 57a can be modeled as follows.

$$e(f,L) = 20 \cdot \log_{10}(|e^{-\gamma(f) \cdot L}|) \quad (5)$$

Where the propagation constant γ depends on the frequency f and can be approximated as follows:

$$\gamma(f) = k \cdot \sqrt{f} + i \cdot 2\pi \frac{f}{c} \quad (6)$$

Where c is the phase velocity (typically c=2e8 m/s).

In order to fit the first transfer function data H log or the data derived from the first transfer function data H log to the curve e(f, L) that represents the transfer function of the telecommunication line 13 without any bridged tap 45, 53, the fitting parameters k, L are optimized so that the envelope of the measured transfer function 57 described by the transfer function data H log or the data derived from the first transfer function data H log is similar to the modeled curve. To this end, any suitable numeric approach can be applied; for example regression techniques, such as non-linear regression can be used in estimate values of the fitting parameters k, L. The resulting dashed curve 81 generated using this fitting approach is depicted in FIG. 6.

Figure 7:
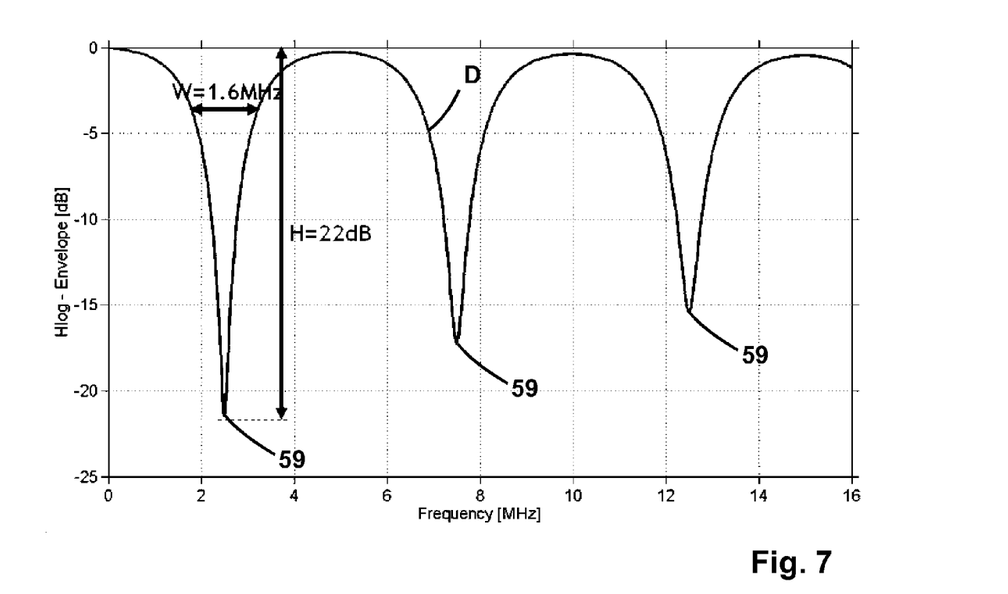
FIGS. 7 and 8 show diagrams of a difference transfer function obtained by subtracting one of the approximated transfer functions from the measured transfer function shown in FIG. 6.
Figure 8:
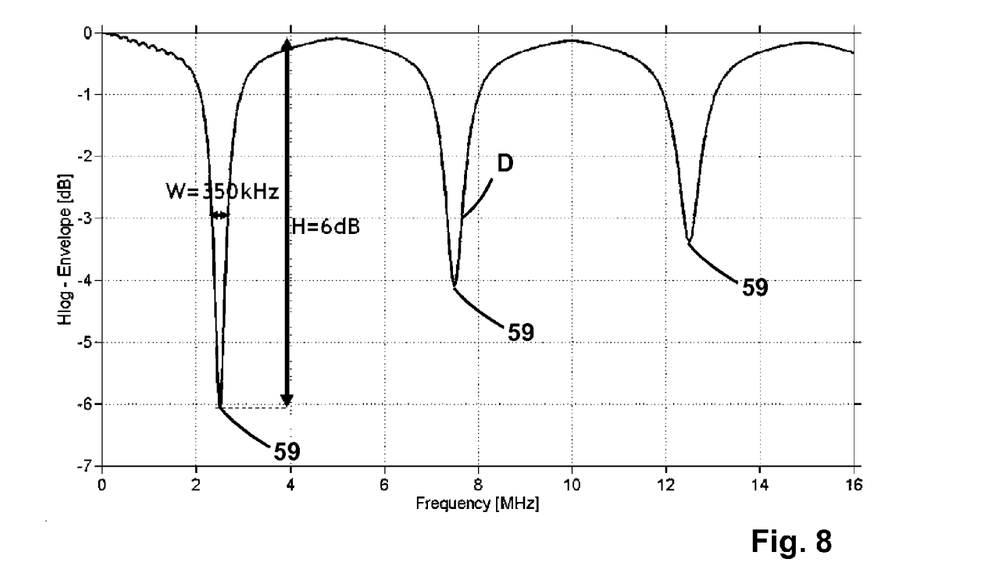

The bridged tap detection block 69 uses the results H log, E of the measurement and analysis block 67 in order to determine whether there is a bridged tap 45, 53 within the telecommunication line 13. A step 83 of the detection block 69 subtracts the second transfer function data E from the first transfer function H log, e.g. by calculating a difference between the respective transfer function data H log, E. Resulting difference transfer functions D are shown in FIGS. 7 and 8.

A branch 85 of the detection block 69 checks whether the difference transfer function D has regularly-spaced local minima 59. If so (Y) then steps of the identification block 71 are executed in order to determine the type of the detected bridged tap. Otherwise (N) the method 65 decides that the telecommunication line 13 has no bridged tap (step 87).

It should be noted that the present invention is not limited to the shown exemplary detection block 69. The detection block 69 can be implemented in a different way. For example, branch 85 can analyze the first transfer function data H log directly instead of the difference transfer function data E in order to determine whether there are regularly-spaced local minima 59.

In an embodiment, a step 91 of the identification block 71 calculates at least one characteristic of the local minima 59, e.g. a depth H of the local minima 59 and a width W of the local minima 59. In an embodiment, the depth H is calculated by subtracting the magnitude of the difference transfer function D at the local minima 59 from the magnitude of the global maximum of the difference transfer function D. In the shown embodiment, the magnitude of the global maximum of the difference transfer function D is 0 dB. Thus, a first local minimum 59 shown in FIG. 7 has a depth of H=22 dB.

The width W of at least one local minimum 59 may be calculated by determining the distance between a first point at the falling slope and a second point at the rising slope of the difference transfer function D, between which slopes the local minimum 59 is located. The first and the second point may be selected such that the difference transfer function D has a predefined level at the first and the second point. In the shown embodiment, this level is −3 dB. This so called 3 dB-width of the first local minimum 59 shown in FIG. 7 is W=1.6 MHz.

An exemplary difference transfer function D in the case of a single wire bridged tap 53 is shown in FIG. 8. The width W=350 kHz and the depth H=6 dB are much less than the depth H and the width W of the local minima 59 caused by a wire pair bridged tap 45 shown in FIG. 7.

The characteristics of the local minima 59 may be compared with pre-defined thresholds and, depending on the result of this comparison, the method 65 may decide whether the bridged tap is a wire pair bridged tap 45 or a single wire bridge-tap 53. For example, thresholds ThH, ThW for the depth and the width of the local minima 59 may be defined and compared with the calculated depth H and the calculated width W. If these values are above the respective thresholds then the type identification block 71 assumes that the bridged tap is a wire pair bridged tap 45, i.e. if H>ThH and W>ThW. Otherwise, a single wire bridged tap 53 is assumed by the identification block 71.

According to another embodiment, the identification block 71 comprises simulating the telecommunication line 13 based on information about the bridged tap detected in block 69. For instance, the fitting parameters L, k and/or tap-length Lt estimated using equation (4) can be used in order to simulate the telecommunication line 13. In this simulation-based embodiment, the above-described step 91 for calculating the characteristics H, W and comparing them with the respective threshold ThH, ThW may be omitted.

The identification block 71 may comprise a step 93 for estimating the length Lt of the bridged tap 45, 53 and a step 95 for determining simulation parameters for simulating the transmission line 13. In the shown embodiment, the simulation parameters correspond to the length value L and the attenuation factor k. These values L, k may be determined during the above-described fitting procedure. In other words, at least one of the simulation parameters corresponds to at least one of the fitting parameters L, k.

Moreover, the identification block 71 has simulation step 97 for simulating the transmission line 13. In an embodiment, the simulation step 97 calculates first simulated transfer function data SH log 1 that characterize a first simulated transfer function (similar to curve 57*b*) of the telecommunication line 13 having a wire pair bridged tap 45. In addition, step 97 may comprise calculating second simulated transfer function data SH log 2 that characterize a second simulated transfer function (similar to curve 57*c*) of the telecommunication line 13 having a single wire bridged tap. In the shown embodiment both pieces of simulated transfer function data SH log 1, SH log 2 are calculated depending on the length Lt of the bridged tap 45, 53, the line length value L and/or the attenuation factor k. In an embodiment, the two simulated transfer function data SH log 1, SH log 2 may be calculated by two consecutive simulation runs.

In an embodiment, in the identification block 71, comprises a comparing step 99. This comparing step 99 determines at least one characteristic of the local minima 59 of the measured transfer function represented by the first transfer function data H log and the same characteristic of the two simulated transfer functions SH log 1 and SH log 2. The at least one characteristic may include the depth H and/or the width W of the local minima 59. Moreover, step 99 determines the type of the bridged tap by comparing the at least one characteristic H, W of the measured transfer function characterized by the first transfer function data H log with the characteristics H, W of the two simulated transfer functions SH log 1, SH log 2. In the shown embodiment, the comparing step 99 distinguishes between two different types of bridged taps, i.e. wire pair bridged taps 45 and single wire bridged taps 53. In other words, step 99 decides depending on the characteristics H, W of the transfer functions characterized by the respective transfer function data H log, SH log 1, SH log 2 on whether the first simulated transfer function or whether the second simulated transfer function is more similar to the measured transfer function represented by the transfer function data H log. However, in other embodiments, different approaches for comparing the functions and/or for determining their similarity may be used. For example, a mathematical similarity measure may be defined and calculated for each pair (H log, SH log 1), (H log, SH log 2) to be considered.

In the shown embodiment, the comparison of step 99 may be performed e.g. as follows. Let the 3 dB width and the depth of the measured local minima be $W_M$ and $H_M$, respectively. Simulated depth and width of the local minima 59 in case of a wire pair bridged tap 45 are $W_{BT}$ and $H_{BT}$, respectively. The simulated depth and width of the local minima 59 in case of a single wire bridged tap 53 are $W_{SW}$ and $H_{SW}$, respectively. A distance d in a (W, H) space between the point representing the measured size of the local minimum 59 and the two points representing the simulated sizes may be measured. Distance d may be weighted in order to compensate the different dynamic ranges of the characteristics W and H and can be defined as follows.

$$d[(W_0, H_0); (W_1, H_1)] = \sqrt{\left(\frac{W_0 - W_1}{\alpha}\right)^2 + \left(\frac{H_0 - H_1}{\beta}\right)^2} \quad (7)$$

The symbols $\alpha$ and $\beta$ are the weights to be used and could be chosen as $$\alpha = f_{max} - f_{min}, \quad (8)$$

i.e. the frequency range over which a transfer function 57 was measured and $$\beta = H\log_{max} - H\log_{min}, \quad (9)$$

i.e. the dynamic range of the measured transfer function 57. Hence, a single-wire bridged tap 53 may be assumed in step 99 if and only if $$d[(W_M,H_M);(W_{SW},H_{SW})] < d[(W_M,H_M);(W_{BT},H_{BT})]. \quad (10)$$

The above description refers to both transfer functions and transfer function data that characterize the respective transfer function. The term "characterize" is used in this context in order to point out that the transfer function is represented or described by the respective transfer function data. The transfer function data may be data that can be stored in a computer such as multiple samples of the transfer function at multiple discrete frequencies. The magnitude of the transfer function samples may be represented and/or stored in a logarithmic scale As a consequence, the first transfer function data H log and the second transfer function data E depend on the measured transfer function and the simulated transfer functions depend on the simulated transfer function data SH log 1, SH log 2 generated by step 97.

To sum up, the method 65 and device described herein not only allow for reliably detect the presence of bridged tap within the telecommunication line 13, but also allows for determining the type of the bridged tap. Deciding whether a certain bridged tap is a single wire bridged tap 53 is particularly useful in cases where network termination circuitry installed by a network operator in the in-house wiring of a customer has electrical characteristics of a single wire bridged tap 53. The method 65 therefore allows for distinguishing the network termination circuitry from unwanted bridged taps. As a consequence, false alerts and wrong repair advices given to field technicians can be avoided. Avoiding the false alarms and the wrong repair advises reduces operational costs for the network operator.

Figure 9:
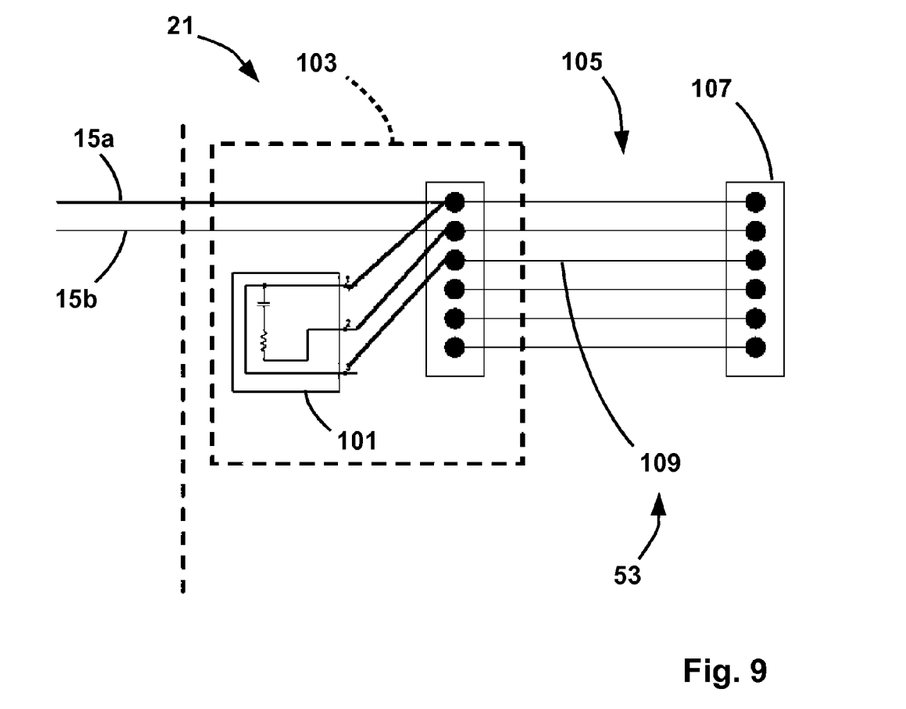
FIG. 9 shows a diagram of a customer's premises in-house wiring including a line termination device causing a single wire bridged tap.

FIG. 9 shows a first line termination device 101 installed in a wall socket 103. The wall socket 103 is typically installed at the customer's premises 21. The wall socket 103 may be connected by means of an internal cable 105 to a secondary socket 107. As can be seen in FIG. 9, the line termination device 101 has line termination circuitry in the form an RC circuit that connects the two electrical conductors 15a, 15b with each other. However, there is an additional direct electric connection between the first electrical conductor 15a and a pin of the wall socket 103. As a consequence, a wire 109 of the internal cable 105 connecting the two sockets 103, 107 with each other form a single wire bridged tap 53. The line termination device 101 shown in FIG. 9 is used very often in France. However in different countries or by different network operators, different types of line termination devices may be applied.

Figure 10:
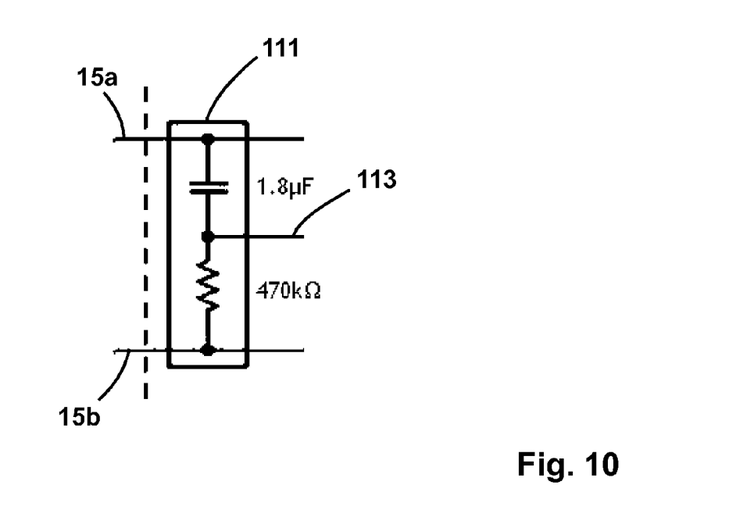
FIG. 10 shows a diagram of a further line termination device that causes a single wire bridged tap when installed within the in-house wiring.

FIG. 10 shows a further example of a line termination device 111 that is connected between the two electrical conductors 15a, 15b of the conductor pair 15. Similar to the line termination device 101 shown in FIG. 9, the further line termination device 111 has an RC circuit connected between the electrical conductors, 15a, 15b. However, a phone ringer wire is connected between a resistor R and a capacitor C of the RC circuit. At high frequencies, such as frequencies belonging to the DSL band, the capacitor behaves as a short circuit. As a consequence, the ringer wire 113 forms a single wire bridged tap 53 within the in-house wiring of the customer.

The invention claimed is:

1. A method for detection of a bridged tap within a telecommunication line, the method comprising:
   determining first transfer function data that characterize an actual transfer function of the telecommunication line;
   detecting the bridged tap based on the first transfer function data, the detecting including determining at least one characteristic of the detected bridged trap;
   simulating the telecommunication line based on a result of said detecting, the simulating including,
      calculating first simulated transfer function data that characterize a first simulated transfer function of the telecommunication line, assuming that the bridged tap is a wire pair bridged tap, based on the at least one characteristic of the identified bridged tap; and
   identifying a type of the bridged tap based on the first transfer function data and the first simulated transfer function data.

2. The method according to claim 1, wherein,
   the type of the bridged tap includes a single wire bridged tap and a wire pair bridged tap, and
   the identifying the type of the bridged tap includes determining whether the detected bridged tap is a single wire bridged tap or a wire pair bridged tap.

3. The method according to claim 1, wherein the at least one characteristic of the detected bridged trap includes a length of the bridged tap.

4. The method according to claim 3, further comprising:
   calculating second simulated transfer function data that characterize a second simulated transfer function of the telecommunication line assuming a single wire bridged tap, based on the at least one characteristic of the identified bridged tap, wherein said identifying the type of the bridged tap is based on the second simulated transfer function data.

5. The method according to claim 1, further comprising:
   determining second transfer function data based on the first transfer function data, the second transfer function data characterizing a second transfer function of the telecommunication line without any bridged taps, and
   the detecting the bridged tap depending on the first transfer function data and the second transfer function data.

6. The method according to claim 5, wherein determining the second transfer function data includes identifying maxima within the actual transfer function and using the maxima as supporting points for calculating the second transfer function data.

7. The method according to claim 6, wherein determining the second transfer function data includes smoothing a function characterized by the second transfer function data.

8. The method according to claim 5, wherein determining the second transfer function data includes fitting the first transfer function data or data derived from the first transfer function data to a curve that represents the transfer function of the telecommunication line without any bridged tap.

9. The method according to claim 8, wherein,
   the curve includes a decaying exponential run, and
   fitting parameters of the curve include at least one of an attenuation factor and a length value, the length value based on the length of the telecommunication line.

10. The method according to claim 5, wherein detecting a bridged tap includes calculating a difference of the two transfer functions, the calculating the difference of the two transfer functions including one of,
   subtracting the second transfer function data from the first transfer function data, or
   subtracting the first transfer function data from the second transfer function data.

11. The method according to claim 5, wherein the method includes calculating the length of the bridged tap based on at least one of the first transfer function and the second transfer function.

12. The method according to claim 8, wherein the simulating of the telecommunication line is based on at least one of the at least one fitting parameter of the curve and the calculated length of the bridged tap.

13. A device for detection of a bridged tap within a telecommunication line, the device comprising:
   a memory storing at least one computer program; and
   a processor configured to execute the at least one computer program to,
   determine first transfer function data that characterizes an actual transfer function of the telecommunication line;
   detect a bridged tap based on the first transfer function data, the detecting including determining at least one characteristic of the detected bridged trap;
   simulate the telecommunication line based on a result of said detecting, the simulating including,
      calculating first simulated transfer function data that characterize a first simulated transfer function of the telecommunication line, assuming that the bridged tap is a wire pair bridged tap, based on the at least one characteristic of the identified bridged tap; and
   identify a type of the bridged tap based on the first transfer function data and the first simulated transfer function data.

14. A non-transitory computer-readable storage medium storing at least one computer program that is executable by a processor to cause the processor to perform a method according to claim 1.

* * * * *